(12) United States Patent
Inoue

(10) Patent No.: US 12,087,118 B2
(45) Date of Patent: Sep. 10, 2024

(54) GATE DEVICE, AUTHENTICATION SYSTEM, GATE CONTROL METHOD, AND STORAGE MEDIUM

(71) Applicant: NEC Corporation, Tokyo (JP)

(72) Inventor: Junichi Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 294 days.

(21) Appl. No.: 17/619,696

(22) PCT Filed: Mar. 18, 2020

(86) PCT No.: PCT/JP2020/012045
§ 371 (c)(1),
(2) Date: Dec. 16, 2021

(87) PCT Pub. No.: WO2021/186628
PCT Pub. Date: Sep. 23, 2021

(65) Prior Publication Data
US 2022/0358804 A1 Nov. 10, 2022

(51) Int. Cl.
*G07C 9/37* (2020.01)
*G06F 21/32* (2013.01)
(Continued)

(52) U.S. Cl.
CPC ............ *G07C 9/37* (2020.01); *G06F 21/32* (2013.01); *G06V 40/172* (2022.01); *G07C 9/15* (2020.01)

(58) Field of Classification Search
CPC .......... G07C 9/37; G07C 9/15; G06V 40/172; G06V 40/16; G06F 21/32
See application file for complete search history.

(56) References Cited

U.S. PATENT DOCUMENTS 9,652,663 B2   5/2017  Lau et al.
11,410,462 B2 * 8/2022  Ogawa .............. G07C 9/10
(Continued)

FOREIGN PATENT DOCUMENTS

CN      111145414 A  *  5/2020
EP       1868158 A2     12/2007
(Continued)

OTHER PUBLICATIONS

Extended European Search Report for EP Application No. 20925864.9, dated on Mar. 22, 2023.
(Continued)

*Primary Examiner* — Jayesh M Jhaveri

(57) ABSTRACT

A gate device is provided which prevents unauthenticated users from passing. The gate device is provided with an acquisition unit, an authentication request unit, a determination unit and a gate control unit. The acquisition unit acquires biological information of a person to be authenticated who is in an authentication area. The authentication request unit transmits to a server device an authentication request that contains the acquired biological information. The determination unit detects a person approaching the local gate device by using a sensor for detecting approaching persons, and determines whether or not the approaching person and the person to be authenticated are the same person. If authentication by the server device is successful and the approaching person and the authenticated person are the same person, then the gate control unit controls the gate to allow passage of the authenticated person.

11 Claims, 14 Drawing Sheets

(51) Int. Cl.
    *G06V 40/16*    (2022.01)
    *G07C 9/15*     (2020.01)

(56) References Cited

U.S. PATENT DOCUMENTS

| | | |
|---|---|---|
| 2007/0046426 A1 | 3/2007 | Ishibashi |
| 2010/0074476 A1 | 3/2010 | Aoki et al. |
| 2017/0070501 A1 | 3/2017 | Saito et al. |
| 2018/0286156 A1 | 10/2018 | Tamai et al. |
| 2019/0147676 A1* | 5/2019 | Madzhunkov .......... G06F 21/32 340/5.2 |
| 2019/0311104 A1* | 10/2019 | Maeno ................ G06F 16/5854 |
| 2021/0117655 A1 | 4/2021 | Kochi et al. |
| 2021/0166512 A1 | 6/2021 | Kunieda et al. |
| 2022/0108576 A1* | 4/2022 | Ozono ............... G07C 9/00896 |

FOREIGN PATENT DOCUMENTS

| | | |
|---|---|---|
| JP | 2007-058763 A | 3/2007 |
| JP | 2014234637 A * | 12/2014 |
| JP | 2015-001790 A | 1/2015 |
| JP | 2018-173923 A | 11/2018 |
| JP | 2019-133364 A | 8/2019 |
| JP | 2020-004088 A | 1/2020 |
| KR | 20190103560 A * | 9/2019 |
| TW | I282941 B * | 6/2007 |
| WO | 2015/136938 A1 | 9/2015 |

OTHER PUBLICATIONS

International Search Report for PCT Application No. PCT/JP2020/012045, mailed on Apr. 14, 2020.

English translation of Written opinion for PCT Application No. PCT/JP2020/012045, mailed on Apr. 14, 2020.

AU Office Action for AU Application No. 2020436230, mailed on Dec. 4, 2023.

* cited by examiner

Fig.6

| GATE IDENTIFIER | FEATURE AMOUNT (BIOLOGICAL INFORMATION) | ... |

AUTHENTICATION REQUEST

Fig.9

USER DATABASE

| USER ID | FEATURE AMOUNT | NAME | SEX | ... |
|---|---|---|---|---|
| ID01 | FV1 | AAA | MALE | ... |
| ID02 | FV2 | BBB | FEMALE | ... |
| ID03 | FV3 | CCC | MALE | ... |
| ... | ... | ... | ... | ... |

Fig.13

| GATE IDENTIFIER | AUTHENTICATION ID | FEATURE AMOUNT | ... |

AUTHENTICATION REQUEST

Fig.14

| GATE IDENTIFIER | PERSON TO BE AUTHENTICATED ID | FEATURE AMOUNT | PERSON TO BE AUTHENTICATED ID | FEATURE AMOUNT | ... |
|---|---|---|---|---|---|

AUTHENTICATION REQUEST

GATE DEVICE, AUTHENTICATION SYSTEM, GATE CONTROL METHOD, AND STORAGE MEDIUM

This application is a National Stage Entry of PCT/JP2020/012045 filed on Mar. 18, 2020, the contents of all of which are incorporated herein by reference, in their entirety.

TECHNICAL FIELD

The some non-limiting embodiments relates to a gate device, an authentication system, a gate control method, and a storage medium.

BACKGROUND ART

Services using face authentication have started to spread. For example, face authentication has started to be applied to various procedures (for example, check in, baggage check, security check, and the like) at airports. A service using face authentication is often provided using a gate device (see PTLs 1 and 2).

For example, PTL 1 describes that unauthorized passage of an unauthenticated person can be prevented while maintaining convenience of walk-through face authentication with a simple configuration. The face authentication system disclosed in PTL 1 includes an image acquisition means, a storage means, a face collation means, and an authorizing means. The image acquisition means sequentially acquires input images by photographing the authentication region. The storage means stores a registered face image of the user registered in advance. The face collation means collates the face image of the person extracted from the input image with the registered face image, and authenticates that the person is the user. When the size of the region indicating the authenticated person in the input image is equal to or more than a predetermined size, the authorizing means permits passage of the person. The face authentication system disclosed in PTL 1 does not permit passage when the person to be authenticated is located away from the camera even when the person to be authenticated is authenticated as an authorized user by face authentication, and permits passage when detecting approach of the person to be authenticated to the camera side.

CITATION LIST

Patent Literature

[PTL 1] JP 2015-001790 A
[PTL 2] JP 2019-133364 A

SUMMARY OF INVENTION

Technical Problem

As disclosed in PTL 1, there is an authentication method of performing face authentication by photographing a user at a walking pace without stopping the user in front of a camera. When the walking pace face authentication is performed, the area sensor is used to detect that the user has reached a predetermined area in front of the gate device. When it is detected that the user has reached the predetermined area, the authentication process starts.

Here, in order to image a person to be authenticated without stopping the person in front of the camera, it is desirable to extend the detection range of the area sensor. However, when the detection range of the area sensor is extended, there is a high possibility that the authentication process using the face image of the user who does not pass through the gate device in the end is performed. When the gate is opened in response to successful authentication of the user, there is a possibility that a third party who has not succeeded in authentication is permitted to pass through the gate.

In this regard, the face authentication system disclosed in PTL 1 determines that the person to be authenticated is located near the gate device by the image process (image process of determining whether the size of the person is equal to or more than a predetermined value). However, the size (height) of the person varies greatly among individuals, and there is no guarantee that the gate is opened at the correct timing in the method of determining the position of the person using the image process. For example, even when the tall user is located far from the gate device, there is a strong tendency to determine that the tall user is approaching the gate device, and there is room for the third party to pass through the gate.

A main object of the some non-limiting embodiments is to provide a gate device, an authentication system, a gate control method, and a storage medium that contribute to preventing passage of an unauthenticated user.

Solution to Problem

According to a first aspect of the some non-limiting embodiments, there is provided a gate device including an acquisition unit that acquires biological information about a person to be authenticated present in an authentication area, an authentication request unit that transmits an authentication request including the acquired biological information to a server device, a determination unit that detects an approaching person using a sensor that detects the approaching person into the gate device and determines whether the approaching person and the person to be authenticated are identical, and a gate control unit that controls a gate in such a way that the person to be authenticated is permitted to pass when authentication by the server device is successful and the approaching person and the person to be authenticated are identical.

According to a second aspect of the some non-limiting embodiments, there is provided an authentication system including a server device that stores biological information about each of a plurality of system users and performs an authentication process using the plurality of pieces of biological information, and a gate device connected to the server device, wherein a gate device includes an acquisition unit that acquires biological information about a person to be authenticated present in an authentication area, an authentication request unit that transmits an authentication request including the acquired biological information to the server device, a determination unit that detects an approaching person using a sensor that detects the approaching person into the gate device and determines whether the approaching person and the person to be authenticated are identical, and a gate control unit that controls a gate in such a way that the person to be authenticated is permitted to pass when authentication by the server device is successful and the approaching person and the person to be authenticated are identical.

According to a third aspect of the some non-limiting embodiments, there is provided a gate control method including the steps, performed by a gate device, of acquiring biological information about a person to be authenticated present in an authentication area, transmitting an authentication request including the acquired biological information to a server device, detecting an approaching person using a sensor that detects the approaching person into the gate device and determining whether the approaching person and the person to be authenticated are identical, and controlling a gate in such a way that the person to be authenticated is permitted to pass when authentication by the server device is successful and the approaching person and the person to be authenticated are identical.

According to a fourth aspect of the some non-limiting embodiments, there is provided a computer-readable storage medium storing a program for causing a computer mounted on a gate device to execute the steps of acquiring biological information about a person to be authenticated present in an authentication area, transmitting an authentication request including the acquired biological information to a server device, detecting an approaching person using a sensor that detects the approaching person into the gate device and determining whether the approaching person and the person to be authenticated are identical, and controlling a gate in such a way that the person to be authenticated is permitted to pass when authentication by the server device is successful and the approaching person and the person to be authenticated are identical.

Advantageous Effects of Invention

According to each aspect of the some non-limiting embodiments, there is provided a gate device, an authentication system, a gate control method, and a storage medium that contribute to preventing passage of an unauthenticated user. The effects of the some non-limiting embodiments are not limited to the above. According to the some non-limiting embodiments, other effects may be exhibited instead of or in addition to the effects.

BRIEF DESCRIPTION OF DRAWINGS

FIG. 6 is a diagram illustrating an example of an authentication request.

FIG. 9 is a diagram illustrating an example of a user database.

FIG. 13 is a diagram illustrating an example of an authentication request.

FIG. 14 is a diagram illustrating an example of an authentication request.

EXAMPLE EMBODIMENT

Figure 1:
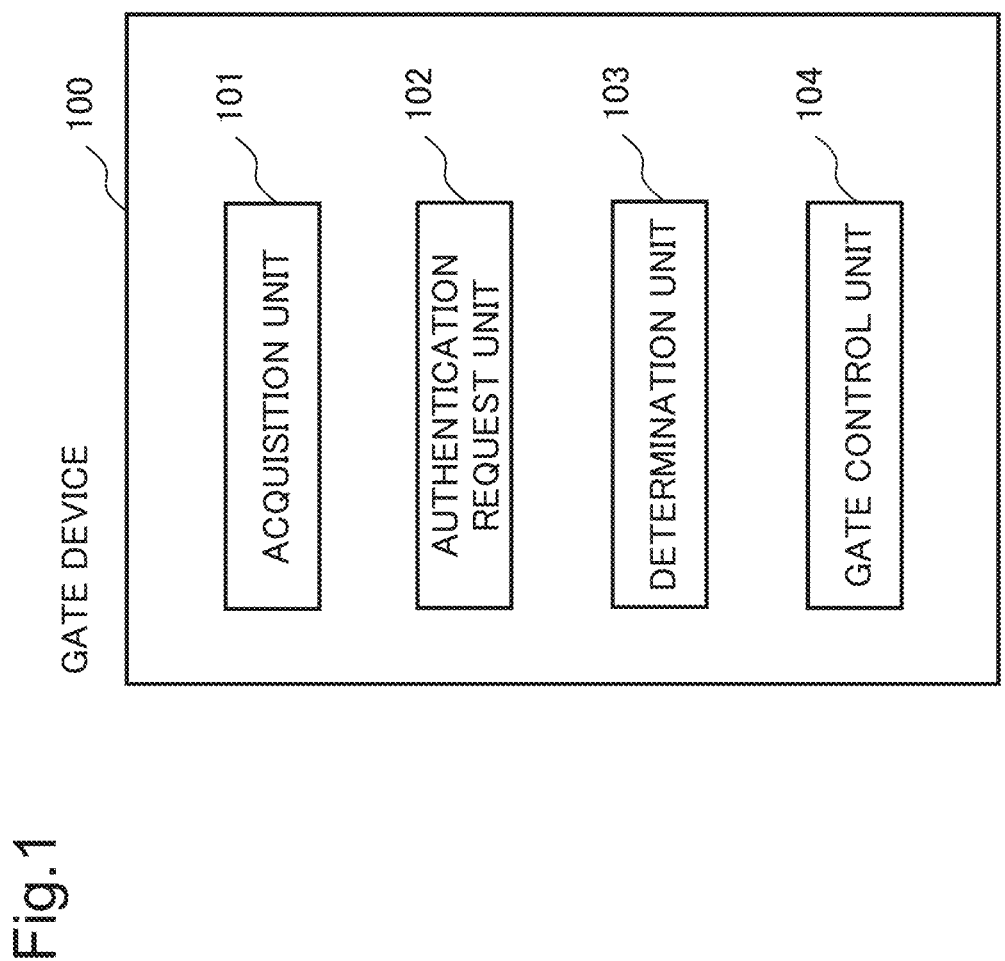
FIG. 1 is a diagram for describing an outline of an example embodiment.

First, an outline of an example embodiment will be described. The reference numerals in the drawings attached to this outline are attached to respective elements for convenience as an example for assisting understanding, and the description of this outline is not intended to be any limitation. In a case where there is no particular explanation, the block described in each drawing represents not a configuration of a hardware unit but a configuration of a functional unit. Connection lines between blocks in each drawing include both bidirectional and unidirectional lines. The unidirectional arrow schematically indicates a flow of a main signal (data), and does not exclude bidirectionality. In the present specification and the drawings, elements that can be similarly described are denoted by the same reference numerals, and redundant description can be omitted.

The gate device 100 according to an example embodiment includes an acquisition unit 101, an authentication request unit 102, a determination unit 103, and a gate control unit 104 (see FIG. 1). The acquisition unit 101 acquires biological information about a person to be authenticated who is in an authentication area. The authentication request unit 102 transmits to a server device an authentication request including the acquired biological information. The determination unit 103 detects an approaching person into the gate device by using a sensor that detects approaching persons, and determines whether the approaching person and the person to be authenticated are identical. When authentication by the server device is successful and the approaching person and the person to be authenticated are identical, then the gate control unit 104 controls the gate to allow passage of the person to be authenticated.

The gate device 100 acquires the biological information about the user who has reached the authentication area, and requests the server device to perform an authentication process using the acquired biological information. In parallel with the authentication process by the server device, the gate device 100 detects a user entering an internal area of the gate device (an area surrounded by a main body of the gate device 100). At this time, since the gate device 100 uses a highly reliable means, such as a passage sensor, to detect an approaching person, reliable detection (detection of an approaching person) is performed. The gate device 100 opens the gate when it is determined that the user who has succeeded in the authentication has entered the area. As a result, an unauthenticated user can be prevented from passing through the gate.

Hereinafter, specific example embodiments will be described in more detail with reference to the drawings.

First Example Embodiment

The first example embodiment will be described in more detail with reference to the drawings.

Figure 2:
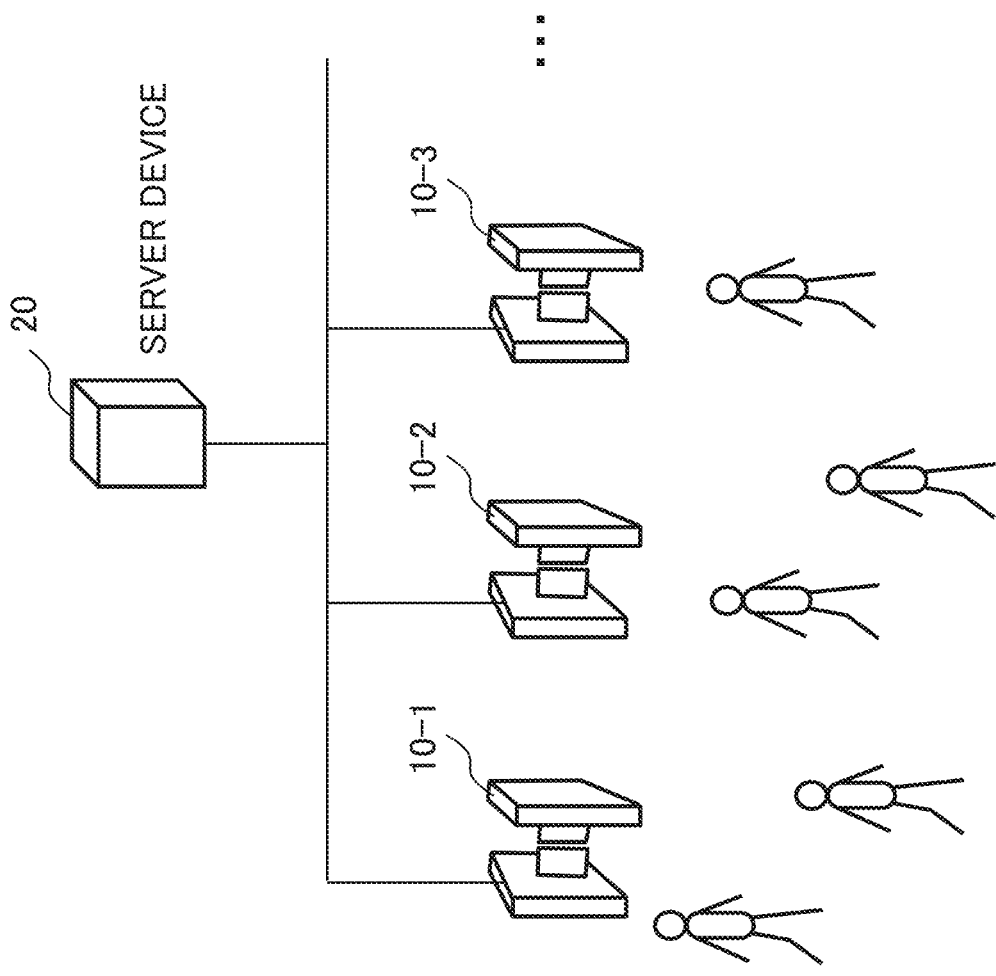
FIG. 2 is a diagram illustrating an example of a schematic configuration of an authentication system according to the first example embodiment.

FIG. 2 is a diagram illustrating an example of a schematic configuration of the authentication system according to the first example embodiment. Referring to FIG. 2, the authentication system includes a plurality of gate devices 10-1 to 10-3 and a server device 20.

In the following description, in a case where there is no particular reason to distinguish the gate devices 10-1 to 10-3, they are simply referred to as a "gate device 10". The configuration illustrated in FIG. 2 is an example and is not intended to limit the number of gate devices 10 or the like. The authentication system may include at least one or more gate devices 10.

Gate device 10 and server device 20 are configured to be able to communicate with each other by wired or wireless communication means. Server device 20 may be installed in the same building as gate device 10, or may be installed on a network (cloud).

The gate device 10 is, for example, a device installed in an airport or a station. Gate device 10 controls passage of a user. The gate device 10 permits passage of a user (hereinafter, it is described as an authentication successful person) who has been successfully authenticated by the server device 20. Gate device 10 does not permit passage of a user who has not been authenticated by the server device 20 or a user who has failed in authentication (hereinafter, it is described as an authentication failure person). In the following description, a user who is not authenticated by the server device 20 is referred to as an "unauthenticated person".

The server device 20 is a device that performs an authentication process. Specifically, server device 20 stores biological information about a user (system user) who is permitted to pass through the gate device 10. The server device 20 performs the authentication process using the biological information acquired from the gate device 10 and the biological information stored in advance, and notifies the gate device 10 of a result of authentication (authentication succeeded, authentication failed).

When it is determined that the result of authentication is "authentication succeeded" and the authentication successful person enters the internal area of the gate device, the gate device 10 opens the gate to permit passage of the person to be authenticated. In other words, even when "authentication succeeded" is received from the server device 20, the gate device 10 does not open the gate unless the authentication successful person enters the internal area of the gate device.

Examples of the biological information about the user include data (feature amount) calculated from physical features unique to an individual such as a face and an iris pattern (pattern). Alternatively, the biological information about the user may be image data such as a face image and an iris image. The biological information about the user may include the physical characteristics of the user as information.

Next, details of each device included in the authentication system according to the first example embodiment will be described. In the following description, a "face image" of the user will be described as an example of the biological information.

[Gate Device]

Figure 3:
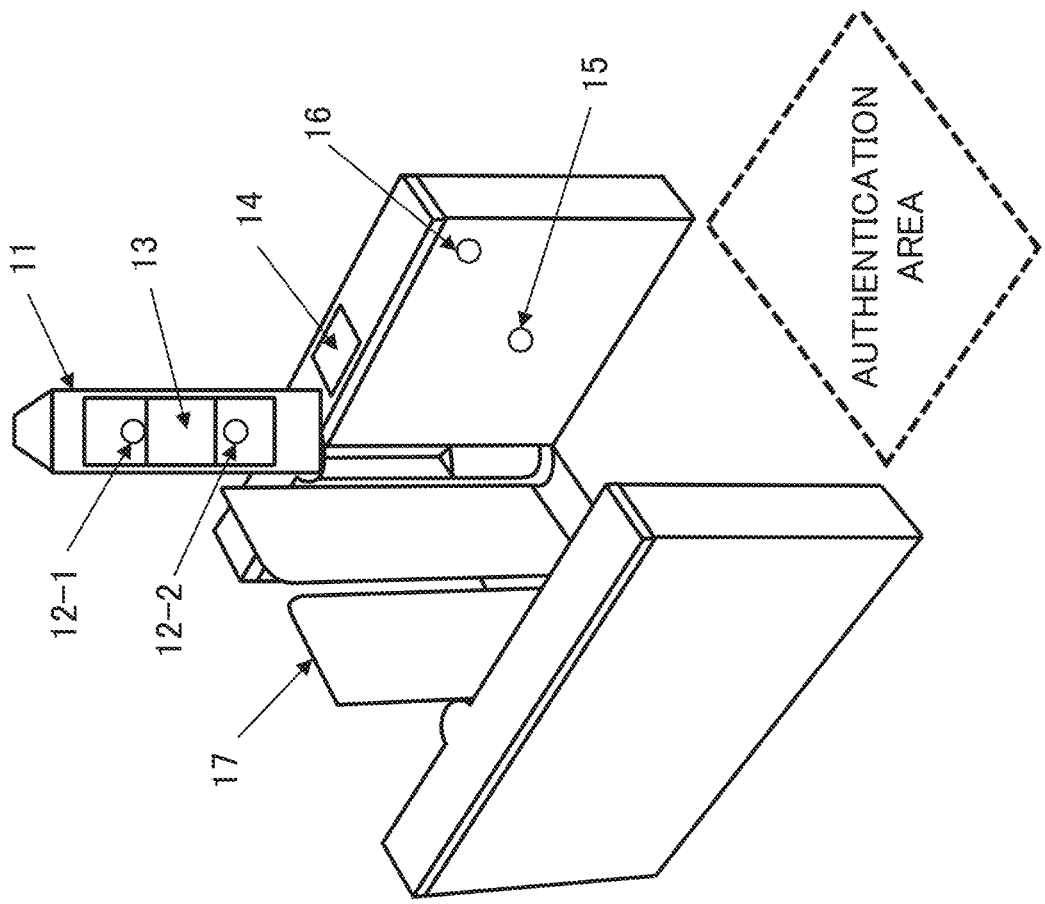
FIG. 3 is a view illustrating an example of an appearance of the gate device according to the first example embodiment.

FIG. 3 is a view illustrating an example of an appearance of the gate device 10 according to the first example embodiment.

Referring to FIG. 3, the gate device 10 includes a face authentication module 11. The face authentication module 11 is attached to the main body of the gate device 10. The face authentication module 11 includes a camera 12. The "main body" of the gate device 10 is a structure forming the center of the gate device 10, and is a member that is in contact with the floor and to which a face authentication module and the like are attached.

The face authentication module 11 includes a light emitting diode (LED) (not illustrated) for dimming and a display 13. The gate device 10 controls an environment (light irradiated to the user) at the time of acquiring the user's face image using the LED for dimming. Gate device 10 notifies the user of a necessary message or the like by using display 13. For example, the gate device 10 displays a result of authentication (authentication succeeded, authentication failed) by the server device 20.

The gate device 10 includes a display 14. Gate device 10 notifies the user of a necessary message or the like by using the display 14. For example, the gate device 10 displays a result of authentication (authentication succeeded, authentication failed) by the server device 20. Alternatively, the gate device 10 may notify the user of a necessary message by using a speaker (not illustrated).

The gate device 10 includes an area sensor 15. The area sensor 15 is a sensor that detects whether a person is present in a predetermined area (an area surrounded by a dotted line in FIG. 3) set in front of the gate device 10. The area sensor 15 can be configured using a sensor (so-called motion sensor) using infrared rays.

When confirming that a person is present in the predetermined area based on the detection signal from the area sensor 15, the gate device 10 controls the camera 12 to acquire image data. In the following description, an area where the area sensor 15 detects the presence of a person is referred to as an "authentication area". When detecting that a person is present in the authentication area, the gate device 10 captures an image of the user located in the authentication area.

The gate device 10 includes an in-gate sensor 16. The in-gate sensor 16 is a sensor that detects that a person enters the inside of the gate device (gate device 10). As the in-gate sensor 16, for example, a sensor (so-called passage sensor using light) including an optical transmission device and an optical reception device can be used. For example, the optical transmission device and the optical reception device are installed to face each other (two devices are installed in an inner wall of the main body). The transmission device constantly transmits light, and the reception device receives the transmitted light. The gate device 10 determines that a person enters gate device 10 when the reception device cannot receive the light. FIG. 3 illustrates one of the two devices constituting the in-gate sensor 16. A plurality of pairs of the in-gate sensors 16 may be provided at substantially equal intervals in the traveling direction of the person.

The gate device 10 includes a gate 17. When confirming that the user is present in the authentication area, the gate device 10 acquires a face image of the user. The gate device 10 generates a feature amount (biological information) from the acquired image to transmit an authentication request including the generated feature amount to the server device 20. The gate device 10 opens the gate 17 when it is determined that the authentication by the server device 20 is successful and the authentication successful person enters the gate device. The gate device 10 closes the gate 17 after the authentication successful person passes through the gate 17.

The type of the gate 17 is not particularly limited, and is, for example, a flapper gate in which a flapper provided from one side or both sides of the passage opens and closes, a turn coil gate in which three bars rotate, or the like.

The face authentication module 11 is installed to be inclined at a predetermined angle with respect to the direction in which the user walks toward the gate device 10. FIG.

4 is a view (plan view) illustrating a case where the gate device 10 is viewed from above.

Figure 4:
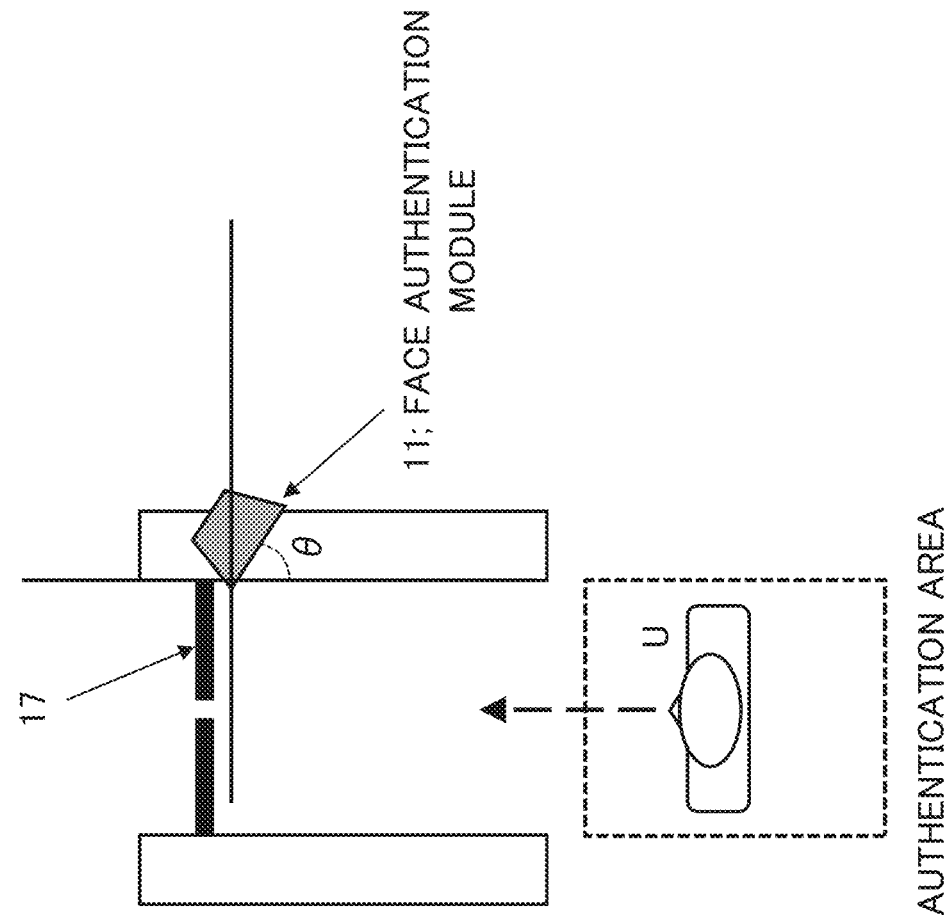
FIG. 4 is a view illustrating an example of a plan view of the gate device according to the first example embodiment.

As illustrated in FIG. 4, the face authentication module 11 is installed to be inclined at an angle θ with respect to a direction in which the user walks (a direction perpendicular to the gate 17). The angle θ is selected (adjusted) in such a way that the camera 12 can image the user U in the authentication area.

When the angle θ is reduced, only the vicinity of the gate device 10 can be imaged, and there is a possibility that the user enters the inside of the gate device 10 before the authentication process using the face image ends. In this case, the user is required to stop and stand by until the authentication process is completed, and it cannot be said that comfortable walk-through can be achieved. On the other hand, when the angle θ is increased, it is possible to capture an image far away from the gate device 10. In this case, although it is advantageous for achieving a comfortable walk-through, there is a possibility that even a user who is not walking toward the gate device may be authenticated. For example, in the example of FIG. 2, the gate device 10-1 captures an image of a user who is not walking toward gate device 10-1, and requests the server device 20 for authentication. As described above, when the angle θ is too large, there is a possibility that the useless authentication process occurs. It is desirable that the administrator and the operator of the system determine the optimum angle in consideration of the advantages and disadvantages caused by the setting angle θ of the face authentication module 11 as described above. As a result of intensive studies by the inventors, it has been found that the angle θ is desirably selected from a range of 30 to 60 degrees.

Figure 5:
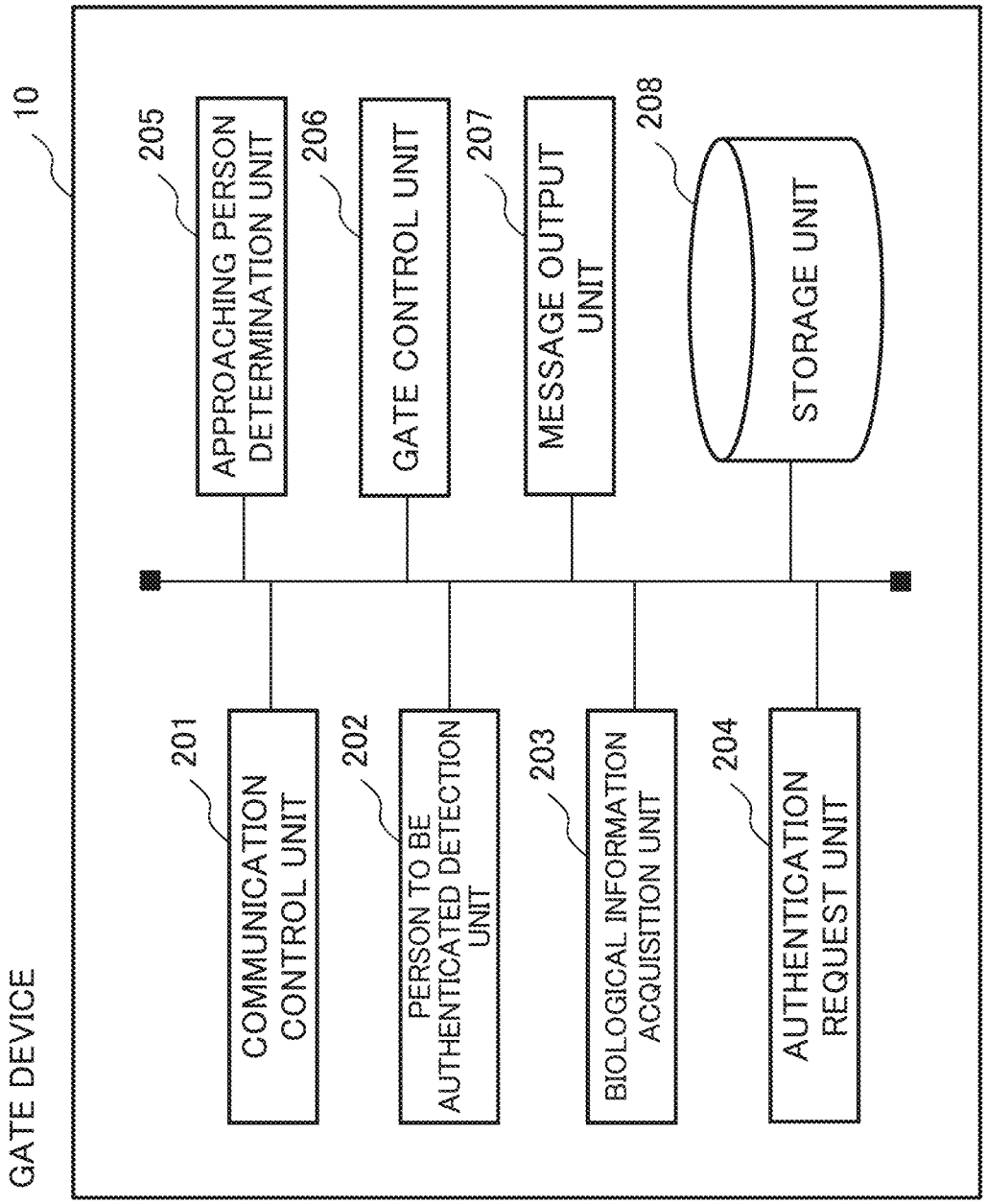
FIG. 5 is a diagram illustrating an example of a processing configuration of the gate device according to the first example embodiment.

FIG. 5 is a diagram illustrating an example of a processing configuration (processing module) of the gate device 10 according to the first example embodiment. Referring to FIG. 5, the gate device 10 includes a communication control unit 201, a person to be authenticated detection unit 202, a biological information acquisition unit 203, an authentication request unit 204, an approaching person determination unit 205, a gate control unit 206, a message output unit 207, and a storage unit 208.

The communication control unit 201 is a means configured to control communication with another device. Specifically, the communication control unit 201 receives data (packet) from the server device 20. The communication control unit 201 transmits data to the server device 20. The communication control unit 201 delivers data received from another device to another processing module. The communication control unit 201 transmits data acquired from another processing module to another device. In this manner, the other processing modules transmit and receive data to and from another device via the communication control unit 201.

The person to be authenticated detection unit 202 is a means configured to detect a person to be authenticated (a user who is a target of the authentication process) in the authentication area. The person to be authenticated detection unit 202 detects a person (user) present in the authentication area based on the detection signal from the area sensor 15. When the output of the area sensor 15 indicates that "there is a user in the authentication area", the person to be authenticated detection unit 202 notifies the biological information acquisition unit 203 of the fact.

The biological information acquisition unit 203 is a means configured to acquire biological information about a person to be authenticated present in the authentication area. Upon acquiring the notification related to "there is a user in the authentication area" from the person to be authenticated detection unit 202, the biological information acquisition unit 203 controls the camera 12 and captures an image of the user located in the authentication area.

The biological information acquisition unit 203 attempts to extract a face image (face region) from the obtained image. For example, the biological information acquisition unit 203 extracts a face image (face region) from the image data by using a learning model learned by a convolutional neural network (CNN). Alternatively, the biological information acquisition unit 203 may extract the face image using a method such as template matching.

In a case where the face image can be extracted, the biological information acquisition unit 203 generates a feature amount (a feature vector including a plurality of feature amounts) from the face image. Specifically, the biological information acquisition unit 203 extracts feature points from the acquired face image. An existing technique can be used for the feature point extraction processing, and thus a detailed description thereof will be omitted. For example, the biological information acquisition unit 203 extracts eyes, a nose, a mouth, and the like as feature points from the face image. Thereafter, the biological information acquisition unit 203 calculates the position of each feature point and the distance between the feature points as feature amounts to generate a feature vector (vector information characterizing the face image) including a plurality of feature amounts.

The biological information acquisition unit 203 delivers the generated feature amount (feature vector) to the authentication request unit 204.

The authentication request unit 204 is a means configured to request the server device 20 to perform the authentication process of the person to be authenticated. The authentication request unit 204 generates an authentication request including the feature amount (biological information) acquired from the biological information acquisition unit 203 to transmit the authentication request to the server device 20.

For example, the authentication request unit 204 generates an authentication request including an identifier (hereinafter, referred to as a gate identifier) of the gate device, a feature amount, and the like (see FIG. 6). As the gate identifier, a media access control (MAC) address or an Internet protocol (IP) address of the gate device 10 can be used.

When transmitting the authentication request to the server device 20, the authentication request unit 204 delivers the feature amount included in the request to the approaching person determination unit 205.

The authentication request unit 204 receives a response to the authentication request from the server device 20. The authentication request unit 204 delivers a response (authentication succeeded, authentication failed) from the server device 20 to the gate control unit 206.

The approaching person determination unit 205 is a means configured to detect an approaching person using an in-gate sensor 16 that detects an approaching person into the gate device (gate device 10) and determines whether the approaching person and the person to be authenticated are identical. The approaching person determination unit 205 monitors (polls) the output of the in-gate sensor 16. When the output of the in-gate sensor 16 indicates "there is an approaching person inside", the approaching person determination unit 205 determines whether the approaching person and the person to be authenticated match. Specifically, the approaching person determination unit 205 controls the camera 12 to acquire a face image, similarly to the biological information acquisition unit 203. The approaching person determination unit 205 calculates a feature amount (a feature amount of an approaching person) from the obtained face image.

The approaching person determination unit 205 determines whether the calculated feature amount (the feature amount of the approaching person) and the feature amount (the feature amount of the person to be authenticated) acquired from the authentication request unit 204 substantially match. Specifically, the approaching person determination unit 205 calculates the similarity between the two feature amounts. A chi-square distance, a Euclidean distance, or the like can be used as the similarity. The similarity is lower as the distance is longer, and the similarity is higher as the distance is shorter. When the similarity is equal to or more than a predetermined value, the approaching person determination unit 205 determines that the two feature amounts substantially match (the approaching person and the person to be authenticated are identical).

In this manner, the approaching person determination unit 205 detects an approaching person based on the detection signal from the passage sensor (the in-gate sensor 16) using light. Thereafter, the approaching person determination unit 205 performs one-to-one collation using two feature amounts (feature amount of approaching person, feature amount of person to be authenticated). Whether the approaching person and the person to be authenticated are identical is determined by the one-to-one collation (one-to-one collation using the biological information about the approaching person and the biological information about the person to be authenticated).

When determining that the approaching person and the person to be authenticated are identical, the approaching person determination unit 205 notifies the gate control unit 206 of the determination.

The gate control unit 206 is a means configured to control the gate 17 included in the gate device 10. The gate control unit 206 opens the gate 17 when the result of authentication of the server device 20 is "authentication succeeded" and the approaching person and the person to be authenticated are identical. In other words, in principle, the gate control unit 206 does not open the gate 17 unless the above condition (authentication succeeded, approaching person and person to be authenticated are identical) is satisfied. The gate control unit 206 closes the gate 17 after a user permitted to pass by using a distance sensor or the like passes through the gate 17.

The message output unit 207 is a means configured to output a message to be notified to the user. The message output unit 207 notifies the user of a necessary message using the displays 13 and 14, a speaker, or the like.

The storage unit 208 is a means configured to store information necessary for the operation of the gate device 10.

Figure 7:
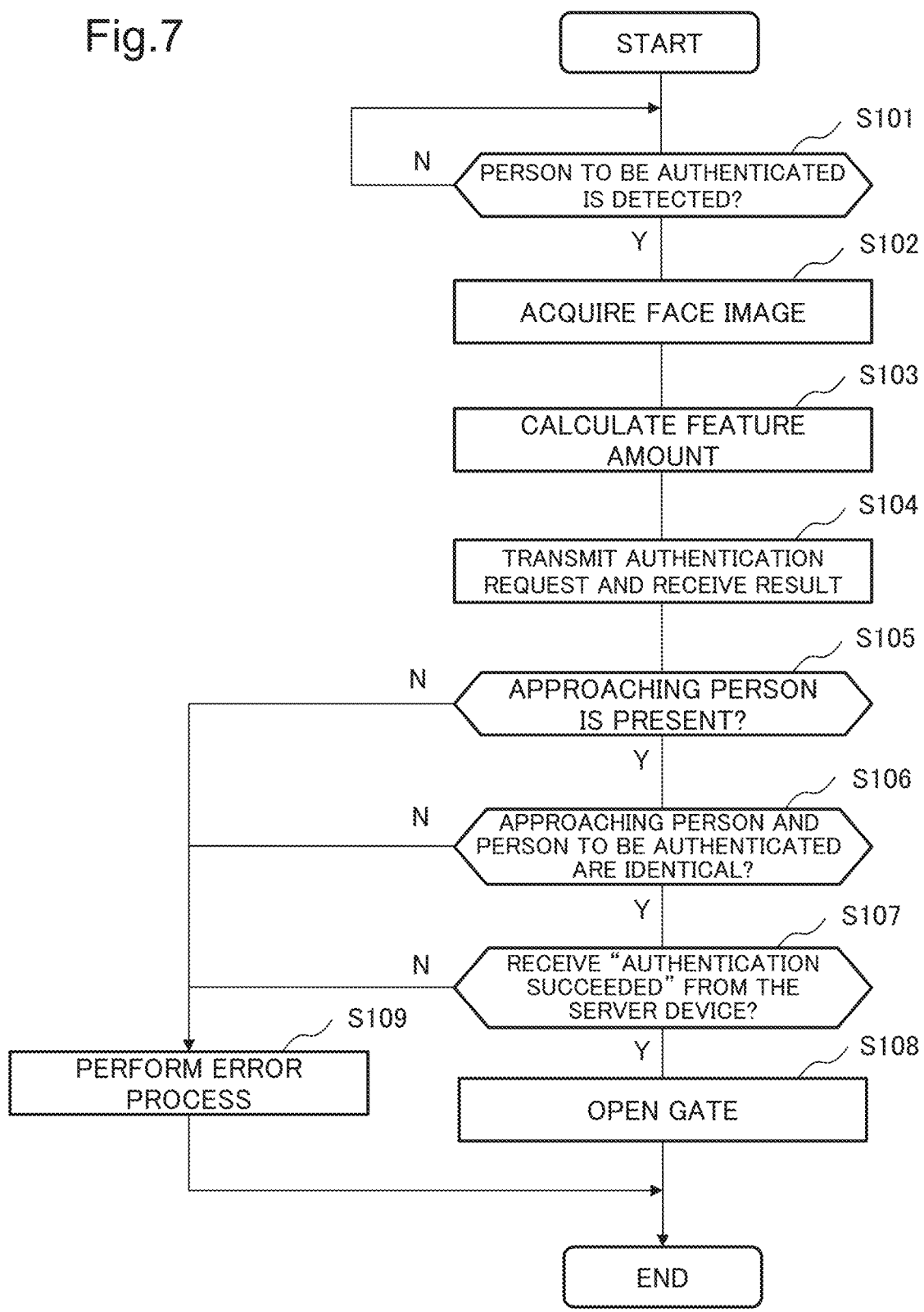
FIG. 7 is a flowchart illustrating an example of an operation of the gate device according to the first example embodiment.

FIG. 7 is a flowchart illustrating an example of the operation of the gate device 10 according to the first example embodiment.

Gate device 10 detects whether the person to be authenticated is present in the authentication area (step S101). When the person to be authenticated is not detected (step S101: No branch), the gate device 10 repeats the process of step S101.

When the person to be authenticated is detected (step S101: Yes branch), the gate device 10 captures an image of the user (person to be authenticated) located in the authentication area to acquire a face image (step S102).

Gate device 10 calculates a feature amount from the face image (step S103).

The gate device 10 transmits an authentication request including the calculated feature amount to the server device 20, and receives a response (result of authentication) to the authentication request (step S104).

Gate device 10 determines whether an approaching person is present inside the gate device (step S105). When the approaching person cannot be detected even after the lapse of the predetermined time from the start of the process of detecting the approaching person (step S105: No branch), the gate device 10 performs the process related to step S109.

When the approaching person is detected during the predetermined period (step S105: Yes branch), the gate device 10 determines whether the approaching person and the person to be authenticated are identical (step S106). When the approaching person and the person to be authenticated are not identical (step S106: No branch), the gate device 10 performs the process related to step S109.

When the approaching person and the person to be authenticated are identical (step S106: Yes branch), the gate device 10 determines whether the result of authentication acquired from the server device 20 is "authentication succeeded" (step S107). When the result of authentication is "authentication failed", the gate device 10 performs the process related to step S109. It is a matter of course that the processing related to step S107 may be performed before the processing related to step S105.

When the result of authentication is "authentication succeeded", the gate device 10 opens the gate 17 (step S108). When a gate opening condition (authentication succeeded, and the approaching person and the person to be authenticated are identical) is satisfied, the gate device 10 controls the gate 17 in such a way that the person to be authenticated is permitted to pass through. At this time, the gate device 10 may display on displays 13 and 14 that the authentication of the person to be authenticated has succeeded.

When the above condition is not satisfied (No branch in any of steps S105, S106, and S107), the gate device 10 performs an error process (step S109). Specifically, when the approaching person cannot be detected during the predetermined period (step S105: No branch), the gate device 10 discards the result of authentication acquired from the server device 20. When the approaching person and the person to be authenticated are different (step S106: No branch), the gate device 10 displays the fact on displays 13, 14. When the authentication by the server device 20 fails (step S107: No branch), the gate device 10 displays the fact on displays 13, 14.

[Server Device]

Figure 8:
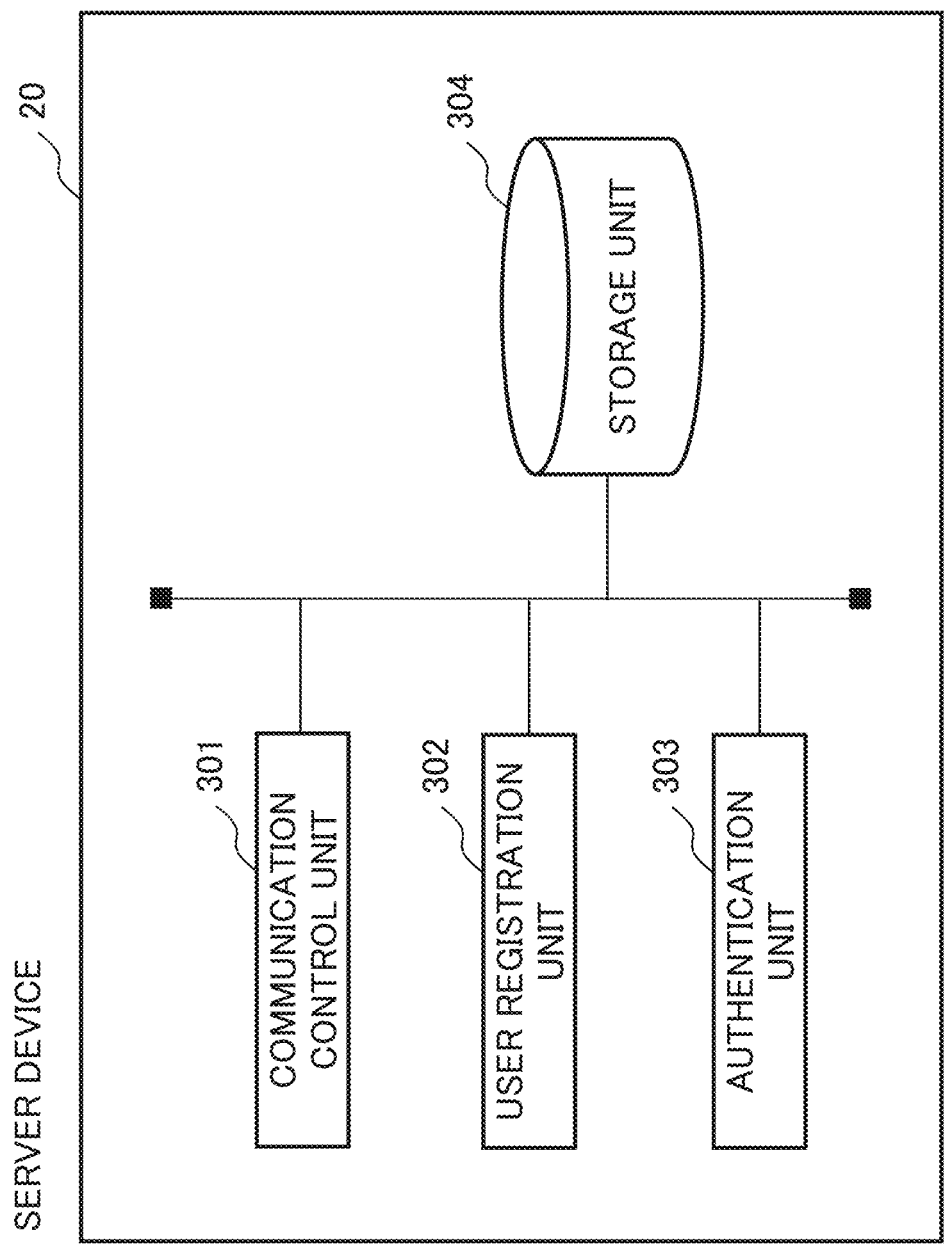
FIG. 8 is a diagram illustrating an example of a processing configuration of the server device according to the first example embodiment.

FIG. 8 is a diagram illustrating an example of a processing configuration (processing module) of the server device 20 according to the first example embodiment. Referring to FIG. 8, the server device 20 includes a communication control unit 301, a user registration unit 302, an authentication unit 303, and a storage unit 304.

The communication control unit 301 is a means configured to control communication with another device. Specifically, communication control unit 301 receives data (packet) from the gate device 10. The communication control unit 301 transmits data to the gate device 10. The communication control unit 301 delivers data received from another device to another processing module. The communication control unit 301 transmits data acquired from another processing module to another device. In this manner, the another processing module transmits and receives data to and from the another device via the communication control unit 301.

The user registration unit 302 is a means configured to perform system registration of a user (system user) who is permitted to pass through the gate device 10. The user registration unit 302 acquires biological information (for example, a face image) of a user who is permitted to pass through the gate device 10 using any means.

For example, in a case where the gate device 10 is a device installed at an airport, the system user inputs biological information and personal information (name, passport number, etc.) to the server device 20 using a web page of an airline company or a kiosk terminal installed at the airport. Alternatively, in a case where the gate device 10 is a device installed at a ticket gate of a station, the system user inputs biological information, personal information, and the like to the server device 20 from a web page of a railway company or the like or a terminal installed at a station.

When acquiring a face image, the user registration unit 302 calculates a feature amount from the face image. The user registration unit 302 registers the biological information (for example, the feature amount calculated from the face image) of the system user in the "user database". The user registration unit 302 registers, in the user database as necessary, a user identifier (ID) for identifying the system user, and personal information (for example, name, nationality, gender, and the like) in association with biological information (see FIG. 9). The user database illustrated in FIG. 9 is an example, and other items may be stored in association with the biological information (feature amount). For example, a "face image" may be registered in the user database.

Authentication unit 303 is a means configured to process the authentication request received from the gate device 10. Specifically, the authentication unit 303 sets the biological information (feature amount) included in the authentication request as the collation target, and performs the collation process with the biological information registered in the user database.

More specifically, the authentication unit 303 sets the feature amount extracted from the authentication request as the collation target, and performs one-to-N (N is a positive integer, and the same applies hereinafter) collation with the plurality of feature amounts registered in the user database.

The authentication unit 303 calculates similarity between the feature amount (feature vector) to be collated and each of the plurality of feature amounts registered. The authentication unit 303 sets the result as "authentication succeeded" if the feature amount whose similarity is equal to or more than the predetermined value is registered in the user database. The authentication unit 303 sets the result as "authentication failed" if the feature amount whose similarity is equal to or more than the predetermined value is not registered in the user database.

The authentication unit 303 identifies a feature amount whose similarity with the feature amount of the collation target is equal to or more than a predetermined value and is the highest among the plurality of feature amounts registered in the user database. The authentication unit 303 transmits the user ID and the personal information related to the identified feature amount to another module and the gate device 10 as necessary. For example, in a case where the gate device 10 is a device installed in an airport, the progress (check-in passage, security check passage, etc.) of the procedure is managed using the information (name, passport number, etc.) identified by the authentication unit 303. For example, in a case where gate device 10 is a device installed at a ticket gate of a station, the fare payment process or the like is performed using the identified information.

The storage unit 304 stores various types of information necessary for the operation of the server device 20. In the storage unit 304, a user database is constructed.

Figure 10:
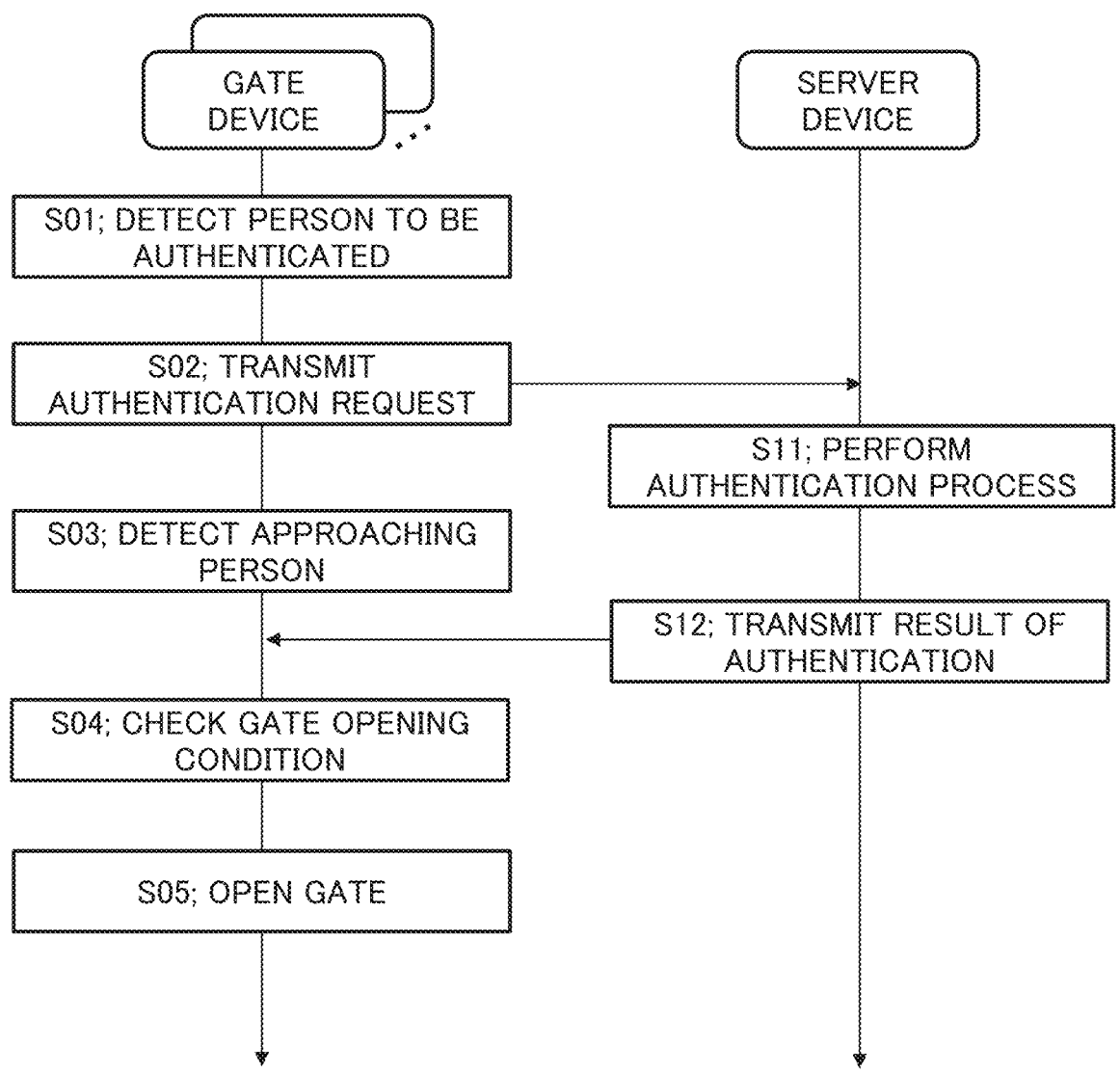
FIG. 10 is a sequence diagram illustrating an example of an operation of the authentication system according to the first example embodiment.

FIG. 10 is a sequence diagram illustrating an example of the operation of the authentication system according to the first example embodiment. It is assumed that the system user is registered in advance prior to the operation of FIG. 10.

Gate device 10 detects a person to be authenticated located in the authentication area (step S01). The gate device 10 may take a measure such that the user can recognize that the authentication process is being performed when the person to be authenticated is detected. For example, the gate device 10 may display the face image of the person to be authenticated on the displays 13 and 14. Alternatively, the gate device 10 may display, on displays 13 and 14, a message or a symbol (for example, an arrow or the like) prompting the user to enter the internal area of the gate device 10 from the authentication area.

Gate device 10 acquires the biological information about the person to be authenticated (the user located in the authentication area) to transmit an authentication request including the biological information to the server device 20 (step S02).

The server device 20 performs the authentication process using the biological information included in the authentication request and the biological information registered in the user database (step S11).

The server device 20 transmits the result of authentication (authentication succeeded, authentication failed) to the gate device 10 (step S12).

The gate device 10 determines whether the person to be authenticated enters the gate device in parallel with the authentication process of the server device 20 (detection of an approaching person; step S03).

Gate device 10 checks whether a condition for opening the gate 17 (gate opening condition) is satisfied (step S04). Specifically, the gate device 10 checks whether the authentication succeeds and whether the approaching person and the person to be authenticated are identical.

When the gate opening condition is satisfied, the gate device 10 opens the gate 17 (step S05).

As described above, the authentication system according to the first example embodiment acquires the biological information about the user who has reached the authentication area, and performs the authentication process using the acquired biological information. In parallel with the authentication process, the gate device 10 detects a user entering the gate device. At this time, since the gate device 10 uses a highly reliable means, such as a "passage sensor", to detect an approaching person, reliable detection (detection of an approaching person) that is not affected by the height or the like of the user is performed. The gate device 10 opens the gate 17 when it is determined that the user who has succeeded in the authentication has entered the area. As a result, in the authentication system according to the first example embodiment, the gate 17 can be opened at the timing when the authentication successful person reaches the inside of the gate device 10, the passage of the unauthenticated user can be prevented, and the comfortable walk-through can be achieved.

Second Example Embodiment

Next, the second example embodiment will be described in detail with reference to the drawings.

In the first example embodiment, the case where the gate 17 is opened when the person to be authenticated enters the inside of the gate device 10 is described. However, in this response, there is room for a third party (authentication failure person, unauthenticated person) who has not succeeded in authentication to pass through the gate 17 together with the person to be authenticated.

In the second example embodiment, an authentication system that prevents a third party together with a person to be authenticated from passing through the gate 17 will be described. That is, in the second exemplary example embodiment, the description will be given about preventing the "tailgating" in which another third party also passes through the gate device 10 when the authentication successful person passes through the gate device 10.

Since the configuration of the authentication system according to the second example embodiment can be the same as that of the first example embodiment, the description related to FIG. 2 is omitted. Since the processing configurations of the gate device 10 and the server device 20 according to the second example embodiment can be the same as those of the first example embodiment, the description thereof will be omitted. Hereinafter, differences between the first and second example embodiments will be mainly described.

When the detection result based on the detection signal of the in-gate sensor 16 is "there is an approaching person inside", the approaching person determination unit 205 of the gate device 10 according to the second example embodiment controls the camera 12 to image the approaching person. When two or more face images are included in the acquired image, the approaching person determination unit 205 determines that "tailgating has occurred".

When detecting the occurrence of tailgating, the approaching person determination unit 205 notifies the gate control unit 206 of the fact.

The gate control unit 206 does not open the gate 17 when tailgating occurs. That is, the gate opening condition according to the second example embodiment is "authentication succeeded, the person to be authenticated and the approaching person are identical, and no tailgating".

Figure 11:
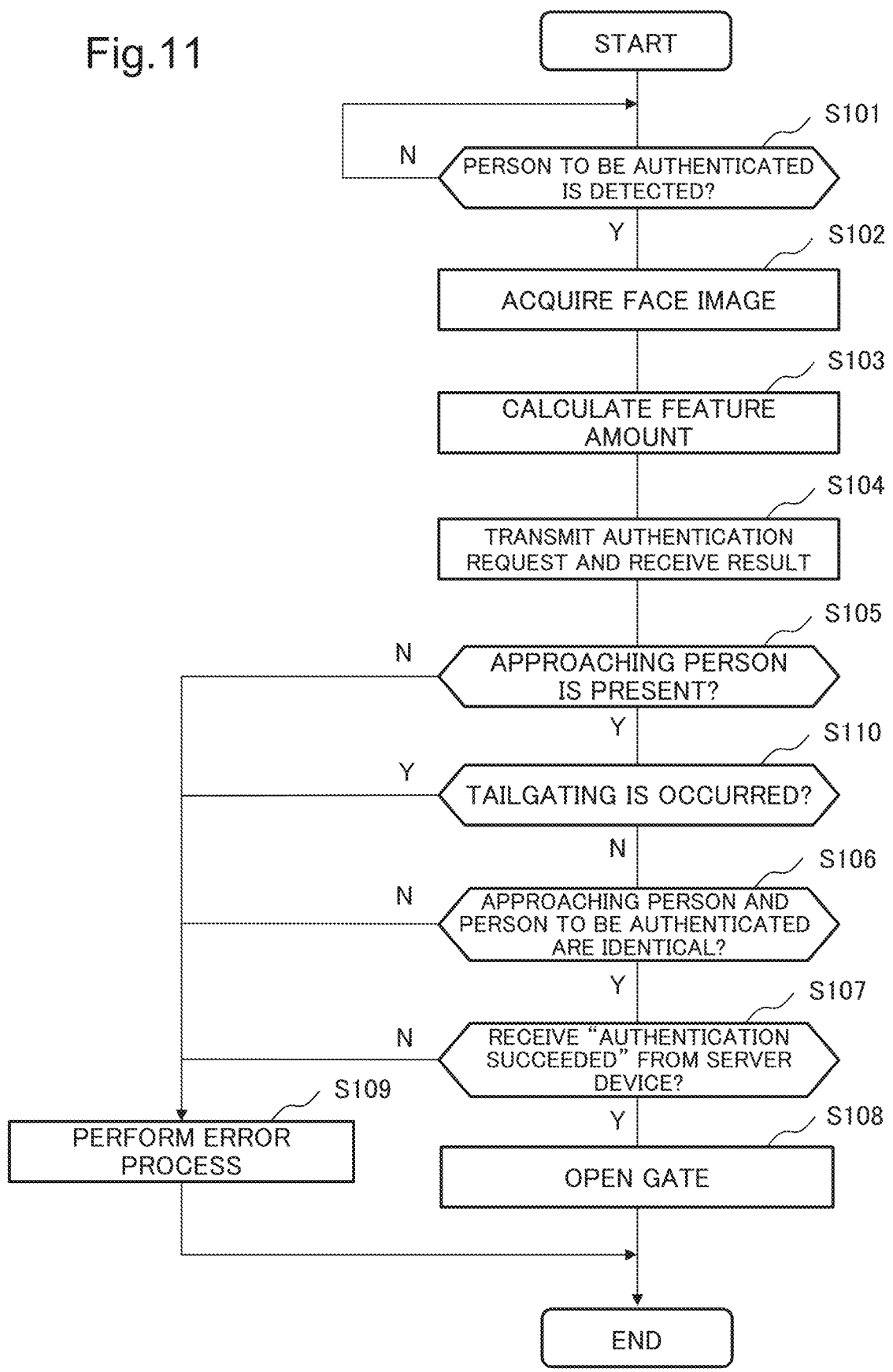
FIG. 11 is a flowchart illustrating an example of the operation of a gate device according to the second example embodiment.

FIG. 11 is a flowchart illustrating an example of the operation of the gate device 10 according to the second exemplary example embodiment. In the flowcharts illustrated in FIGS. 7 and 11, the same processes are denoted by the same reference numerals (steps), and redundant description is omitted.

When the approaching person is detected (step S105: Yes branch), the gate device 10 analyzes the image to determine whether the tailgating has occurred (step S110). When tailgating has occurred (step S110: Yes branch), the gate device 10 performs an error process (step S109). For example, the gate device 10 outputs a message indicating that tailgating has been detected and that the tailgating person goes outside.

After the error process is performed, the gate device 10 may perform the process such as detection of an approaching person (step S105) and detection of the occurrence of tailgating (step S110) again.

When tailgating does not occur (step S110: No branch), the gate device 10 performs the process in and after step S106.

Modified Example According to Second Example Embodiment

As described above, it is desirable that gate device 10 output a predetermined message (for example, a message prompting a tailgating person to go outside) when detecting the occurrence of tailgating. Furthermore, the gate device 10 may change the message to be output according to the analysis result of the image data captured by the approaching person determination unit 205.

Specifically, the approaching person determination unit 205 images an approaching person based on a detection signal of the in-gate sensor 16. The approaching person determination unit 205 determines whether two or more face images are included in the obtained image data. When two or more face images are included, the approaching person determination unit 205 determines whether the face image of the person to be authenticated is included in the image data. For example, the approaching person determination unit 205 determines whether a face image having a feature amount substantially matching the feature amount acquired from the authentication request unit 204 is included in the image data.

The approaching person determination unit 205 notifies the message output unit 207 of the determination result.

When two or more face images are included in the image data and the face image of the person to be authenticated is included in the image data, the fact indicates that a third party (tailgating person) together with the person to be authenticated enters the inside of the gate device 10. In this case, the message output unit 207 outputs a message prompting the tailgating person to go outside. For example, the message output unit 207 outputs a message such as "a person behind should step back".

When the image data includes two or more face images and does not include the face image of the person to be authenticated, the approaching persons (two or more approaching persons) to the gate device 10 cannot pass through the gate 17. In such a case, message output unit 207 outputs a message prompting two or more approaching persons to go outside the gate device 10. For example, the message output unit 207 outputs a message such as "all the people in the gate should step back".

As described above, the message output unit 207 may change the message to be output according to whether the image data includes the face image of the person to be authenticated. That is, the gate device 10 may analyze image data obtained by capturing an image of an approaching person, and may change a message to be output according to a result of the analysis.

As described above, in the authentication system according to the second example embodiment, the gate device 10 acquires image data including an approaching person, and determines whether two or more face images are included in the acquired image data. When two or more face images are included in the image data, gate device 10 determines that "tailgating occurs". That is, in a case where two or more face images are not included in the image data, the gate device 10 controls the gate 17 in such a way that the person to be authenticated is permitted to pass. As a result, it is possible to prevent a third party together with the person to be authenticated from passing through the gate 17.

Figure 12:
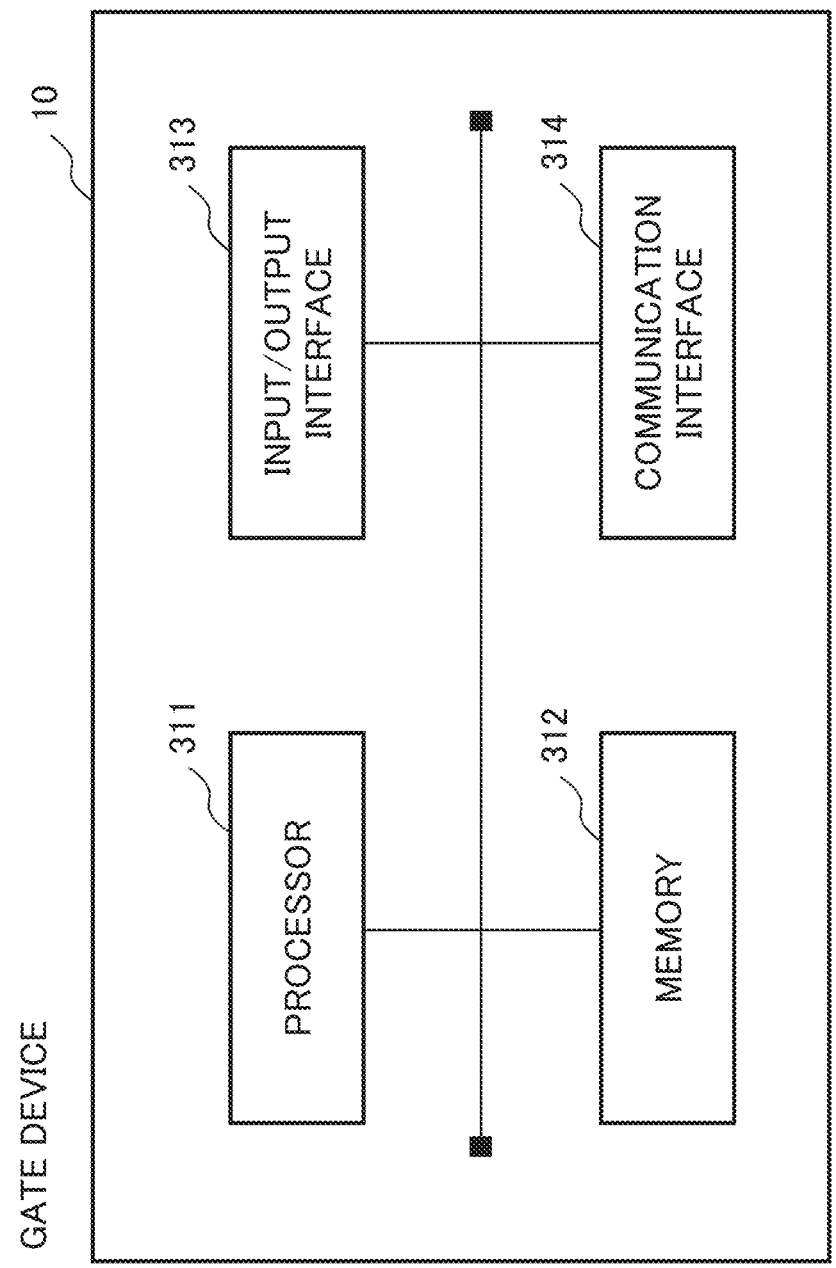
FIG. 12 is a diagram illustrating an example of a hardware configuration of the gate device.

Next, hardware of each device constituting the authentication system will be described. FIG. 12 is a diagram illustrating an example of a hardware configuration of the gate device 10. Since the face authentication module 11, the camera 12, and the like have already been described, these elements are not illustrated in FIG. 12.

The gate device 10 includes a processor 311, a memory 312, an input/output interface 313, a communication interface 314, and the like. The components such as the processor 311 are connected by an internal bus or the like and are configured to be able to communicate with each other.

However, the configuration illustrated in FIG. 12 is not intended to limit the hardware configuration of the gate device 10. The gate device 10 may include hardware (not illustrated) or may not include the input/output interface 313 as necessary. The number of processors 311 and the like included in the gate device 10 is not limited to the example of FIG. 12, and for example, a plurality of processors 311 may be included in the gate device 10.

The processor 311 is a programmable device such as a central processing unit (CPU), a micro processing unit (MPU), or a digital signal processor (DSP). Alternatively, the processor 311 may be a device such as a field programmable gate array (FPGA) or an application specific integrated circuit (ASIC). The processor 311 is configured to perform various programs including an operating system (OS).

The memory 312 is a random access memory (RAM), a read only memory (ROM), a hard disk drive (HDD), a solid state drive (SSD), or the like. The memory 312 stores an OS program, an application program, and various pieces of data.

The input/output interface 313 is an interface of a display device or an input device (not illustrated). The display device may be the display 14. The input device may be a touch panel integrated with the display 14.

The communication interface 314 is a circuit, a module, or the like that communicates with another device. For example, the communication interface 314 includes a network interface card (NIC) or the like.

The functions of the gate device 10 are implemented by various processing modules. The processing module is implemented, for example, by the processor 311 executing a program stored in the memory 312. The program can be recorded in a computer-readable storage medium. The storage medium may be a non-transient (non-transitory) medium such as a semiconductor memory, a hard disk, a magnetic recording medium, or an optical recording medium. That is, the some non-limiting embodiments can also be embodied as a computer program product. The program can be downloaded via a network or updated using a storage medium storing the program. Further, the processing module may be achieved by a semiconductor chip.

The server device 20 can be configured similarly to the gate device 10, and a basic hardware configuration of the server device is not different from that of the gate device 10, so that the description is omitted.

The gate device 10 is equipped with a computer, and can achieve the function of the gate device 10 by causing the computer to execute a program. The gate device 10 performs the gate control method by the program.

Modified Example

The configuration, operation, and the like of the authentication system described in the above example embodiment are merely examples, and are not intended to limit the configuration and the like of the system.

The application destination of the gate device 10 of the present disclosure is not particularly limited. For example, "airport" is exemplified as an application destination (installation place) of the gate device 10 of the present disclosure. Specifically, the gate device 10 may be used as part of a device responsible for an examination system using biometric authentication performed at an airport. In the examination system, identity confirmation (confirmation as to whether the photographed face image matches the face image described in the passport) is performed at the time of check-in, and face data (face image or feature amount), flight information, and passport information are stored in association with each other. When the identity confirmation is completed, a token for performing the examination in biometric authentication is generated. The gate device 10 of the present disclosure is installed in various examination areas (for example, the safety inspection site) in an airport, and the gate device 10 authenticates a user by collating a face image registered at the time of check in with a face image captured by the gate device.

In the above example embodiment, the case where the biological information related to the feature amount generated from the face image is transmitted from the gate device 10 to the server device 20 is described. However, the "face image" itself may be transmitted as the biological information from the gate device 10 to the server device 20. The server device 20 may generate a feature amount from the acquired face image and perform the authentication process (one-to-N collation). Even when the face image itself is transmitted to the server device 20, the gate device 10 determines the identity between the person to be authenticated and the approaching person using the feature amount generated from the face image.

In the above example embodiment, the determination on the identity between the person to be authenticated and the approaching person is performed by the gate device 10, but the determination may be performed by the server device 20. In this case, the gate device 10 acquires biological information about an approaching person into the internal area to transmit the biological information to the server device 20. The server device 20 may collate the biological information included in the authentication request with the biological information about the approaching person to determine the identity between the person to be authenticated and the approaching person.

In the above example embodiment, an approaching person is detected using the in-gate sensor 16, but the approaching person may be detected by analyzing an image obtained from the camera 12.

In the above-described example embodiment, a so-called client server system is described in which the gate device 10 transmits the authentication request to the server device 20, and the server device 20 processes the request. However, the authentication process performed by the server device 20 may be performed by the gate device 10. That is, some or all of the functions of the server device 20 may be implemented by the gate device 10.

In the above example embodiment, it is assumed that the camera 12 is a monocular camera, but the camera 12 may be a depth camera (stereo camera) capable of measuring the depth direction. In this case, the gate device 10 may detect the person to be authenticated in the authentication area using an image obtained from the stereo camera instead of the area sensor 15. Specifically, the gate device 10 analyzes two images obtained from the stereo camera (analysis using parallax), and calculates the position of the user (person to be authenticated) based on the face authentication module 11. When the calculated position is within a predetermined authentication area, the gate device 10 determines that "there is a person to be authenticated".

Alternatively, the gate device 10 may accurately grasp a positional relationship between a plurality of approaching persons (person to be authenticated, tailgating person) using a stereo camera. The gate device 10 may change the message associated with occurrence of the tailgating based on the position of the approaching person. For example, in a case where a tailgating person (authentication failure person, unauthenticated person) follows the person to be authenticated, the gate device 10 outputs a message such as "the person behind should get out of the gate". On the other hand, in a case where the person to be authenticated follows the tailgating person, the gate device 10 outputs a message such as "the person in front should get out of the gate".

In the above example embodiment, the case where it is determined that "tailgating has occurred" when two or more face images are included in image data obtained when an approaching person to the gate device 10 is detected is described. However, even in a case where no tailgating has occurred (in a case where no tailgating has occurred due to the installation status of the face authentication module 11 or the like), there is a possibility that two or more face images are included in one piece of image data. Gate device 10 may use the size of the face image (face region) included in the image data to prevent an erroneous determination of tailgating. For example, in a case where the size of the face region or the distance between the eyes included in the image data is smaller than a predetermined value, the gate device 10 ignores such a face region and determines the occurrence of tailgating.

Alternatively, the occurrence of tailgating may be detected using a camera different from the camera 12 installed in the face authentication module 11. That is, the "camera for tailgating detection" may be installed at an angle or the like at which no erroneous determination of tailgating occurs, and the gate device 10 may detect the occurrence of tailgating using image data obtained from the camera.

In the above example embodiment, it is assumed that there is one user in the authentication area. However, in practice, there may be a plurality of users in the authentication area. That is, it is also assumed that a plurality of persons to be authenticated appears in one piece of image data. In this case, the gate device 10 may transmit an authentication request for each of the plurality of persons to be authenticated to the server device 20, or may transmit one authentication request related to the plurality of persons to be authenticated to the server device 20. In the former case, in order to distinguish the authentication requests transmitted from one gate device 10, it is desirable to include an ID (authentication ID) for distinguishing the authentication requests in the authentication request (see FIG. 13). In the latter case, in order to distinguish respective feature amounts (biological information) included in one authentication request, it is desirable to include a set of feature amounts related to the ID of the person to be authenticated (person to be authenticated ID) in the authentication request (FIG. 14). The server device 20 notifies gate device 10 of the result of authentication (authentication succeeded, authentication failed) using the authentication ID and the person to be authenticated ID.

In a case where authentication for a plurality of persons to be authenticated is requested to the server device 20 at the same time (in parallel), it is desirable that the gate device 10 change the tailgating determination criterion. For example, when the authentication request is transmitted to the server device 20 for two persons to be authenticated, the gate device 10 opens the gate 17 if the number of approaching persons is two and the two approaching persons are both the persons to be authenticated. In this case, when three or more face images are included in the image data, the gate device 10 may determine that "tailgating has occurred".

The gate device 10 may change the control of the LED for dimming according to the purpose of an acquired image (face image; biological information). For example, the gate device 10 may change the light intensity between the case of imaging the person to be authenticated in the authentication area and the case of imaging the approaching person into the gate device.

A plurality the gate devices 10 may operate in conjunction with each other or in cooperation with each other. Specifically, the server device 20 may transmit a response to the authentication request acquired from one gate device 10 to another gate device 10. For example, in the example of FIG. 2, the result of authentication for the authentication request acquired from the gate device 10-1 may be transmitted to each of the gate devices 10-1 to 10-3. In this case, even when the person to be authenticated detected by the gate device 10-1 moves to the gate device 10-2 (even when the person to be authenticated enters the gate device 10-2), the person to be authenticated is permitted to pass through the gate device 10-2. In this case, the biological information about the person to be authenticated generated by the gate device 10-1 is transmitted from the gate device 10-1 to the other gate devices 10-2 and 10-3. Alternatively, the biological information about the person to be authenticated may be transmitted from the server device 20 to the other gate devices 10-2 and 10-3.

A form of data transmission and reception between the gate device 10 and the server device 20 is not particularly limited, but data transmitted and received between these devices may be encrypted. The face image and the feature amount calculated from the face image are personal information, and in order to appropriately protect the personal information, it is desirable that encrypted data be transmitted and received.

The gate device 10 may be installed in a limited space of an existing facility, for example. In this case, the length of the gate device 10 in the traveling direction of the person who passes through the gate device 10 can be about 1.5 meters, which is shorter than 2 to 3 meters, which is the length of a general face authentication gate, and the distance to the gate 17 can be, for example, 96 centimeters (related to one and a half steps of the stride of an adult male). When the length of the gate device 10 is about 1.5 meters, the length of the authentication area in the traveling direction is preferably about 30 cm to 60 cm.

In the flow chart (flowchart and sequence diagram) used in the above description, a plurality of steps (processes) is described in order, but the execution order of the steps performed in the example embodiment is not limited to the described order. In the example embodiment, for example, the order of the illustrated steps can be changed within a range in which there is no problem in terms of content, such as performing each process in parallel.

The above example embodiments have been described in detail in order to facilitate understanding of the present disclosure, and it is not intended that all the configurations described above are necessary. In a case where a plurality of example embodiments is described, each example embodiment may be used alone or in combination. For example, part of the configuration of the example embodiment can be replaced with the configuration of another example embodiment, or the configuration of another example embodiment can be added to the configuration of the example embodiment. Furthermore, it is possible to add, delete, and replace another configuration for part of the configuration of the example embodiment.

Although the industrial applicability of the some non-limiting embodiments is apparent from the above description, the some non-limiting embodiments can be suitably applied to an authentication system installed in an airport, a station, or the like.

Some or all of the above example embodiments may be described as the following supplementary notes, but are not limited to the following.

[Supplementary Note 1]

A gate device including:
- an acquisition unit that acquires biological information about a person to be authenticated present in an authentication area;
- an authentication request unit that transmits an authentication request including the acquired biological information to a server device;
- a determination unit that detects an approaching person using a sensor that detects the approaching person into the gate device and determines whether the approaching person and the person to be authenticated are identical; and
- a gate control unit that controls a gate in such a way that the person to be authenticated is permitted to pass when authentication by the server device is successful and the approaching person and the person to be authenticated are identical.

[Supplementary Note 2]

The gate device according to Supplementary Note 1, wherein the determination unit acquires biological information about the approaching person, and determines whether the approaching person and the person to be authenticated are identical by one-to-one collation using biological information about the approaching person and biological information about the person to be authenticated.

[Supplementary Note 3]

The gate device according to Supplementary Note 1 or 2, wherein the determination unit acquires image data including the approaching person and determines whether two or more face images are included in the acquired image data, and
- the gate control unit controls the gate in such a way that the person to be authenticated is allowed to pass in a case where two or more face images are not included in the image data.

[Supplementary Note 4]

The gate device according to Supplementary Note 3, further including an output unit that outputs a predetermined message in a case where two or more face images are included in the image data.

[Supplementary Note 5]

The gate device according to Supplementary Note 4, wherein the output unit changes the output predetermined message according to whether the image data includes a face image of the person to be authenticated.

[Supplementary Note 6]

The gate device according to any one of Supplementary Notes 1 to 5, wherein
- the acquisition unit acquires a face image of the person to be authenticated, and
- the authentication request unit transmits the authentication request including a feature amount generated from a face image of the person to be authenticated to the server device.

[Supplementary Note 7]

The gate device according to any one of Supplementary Notes 1 to 6, wherein the determination unit detects the approaching person based on a detection signal from a passage sensor using light.

[Supplementary Note 8]

The gate device according to any one of Supplementary Notes 1 to 7, further including a detection unit that detects the person to be authenticated in the authentication area.

[Supplementary Note 9]

The gate device according to Supplementary Note 8, wherein the detection unit detects the person to be authenticated based on a detection signal from a motion sensor using infrared rays.

[Supplementary Note 10]

An authentication system including:
- a server device that stores biological information about each of a plurality of system users and performs an authentication process using the plurality of pieces of biological information; and
- a gate device connected to the server device, wherein the gate device includes:
- an acquisition unit that acquires biological information about a person to be authenticated present in an authentication area;
- an authentication request unit that transmits an authentication request including the acquired biological information to the server device;
- a determination unit that detects an approaching person using a sensor that detects the approaching person into the gate device and determines whether the approaching person and the person to be authenticated are identical; and
- a gate control unit that controls a gate in such a way that the person to be authenticated is permitted to pass when authentication by the server device is successful and the approaching person and the person to be authenticated are identical.

[Supplementary Note 11]

A gate control method including:
- by a gate device,
- acquiring biological information about a person to be authenticated present in an authentication area;
- transmitting an authentication request including the acquired biological information to a server device;
- detecting an approaching person using a sensor that detects the approaching person into the gate device and determining whether the approaching person and the person to be authenticated are identical; and
- controlling a gate in such a way that the person to be authenticated is permitted to pass when authentication by the server device is successful and the approaching person and the person to be authenticated are identical.

[Supplementary Note 12]

A computer-readable storage medium storing a program for causing a computer mounted on a gate device to execute processes of:
- acquiring biological information about a person to be authenticated present in an authentication area;
- transmitting an authentication request including the acquired biological information to a server device;
- detecting an approaching person using a sensor that detects the approaching person into the gate device and determining whether the approaching person and the person to be authenticated are identical; and
- controlling a gate in such a way that the person to be authenticated is permitted to pass when authentication by the server device is successful and the approaching person and the person to be authenticated are identical.

The disclosures of the cited prior art documents are incorporated herein by reference. While the example embodiments of the some non-limiting embodiments have been described above, the some non-limiting embodiments is not limited to these example embodiments. It will be understood by those skilled in the art that these example embodiments are exemplary only and that various variations are possible without departing from the scope and spirit of the some non-limiting embodiments. That is, it goes without saying that the some non-limiting embodiments includes various modifications and corrections that can be made by those skilled in the art in accordance with the entire disclosure including the claims and the technical idea.

REFERENCE SIGNS LIST 10, 10-1 to 10-3, 100 gate device
11 face authentication module
12 camera
13 display
14 display
15 area sensor
16 in-gate sensor
17 gate
20 server device
101 acquisition unit
102, 204 authentication request unit
103 determination unit
104, 206 gate control unit
201, 301 communication control unit
202 person to be authenticated detection unit
203 biological information acquisition unit
205 approaching person determination unit
207 message output unit
208, 304 storage unit
302 user registration unit
303 authentication unit
311 processor
312 memory
313 input/output interface
314 communication interface

What is claimed is:

1. A gate device comprising:
at least one memory configured to store instructions; and
at least one processor configured to execute the instructions to:
acquire biological information about a person to be authenticated, wherein the person to be authenticated is present in an authentication area when the biological information is acquired;
transmit an authentication request including the acquired biological information to a server device;
detect an approaching person using a sensor that detects the approaching person within the gate device and determine whether the approaching person and the person to be authenticated are identical; and
control a gate in such a way that the person to be authenticated is permitted to pass when authentication by the server device in response to the authentication request is successful, the approaching person has been detected within the gate device within a predetermined time period after a process of detecting whether the approaching person is present within the gate device has been started, and the approaching person and the person to be authenticated are identical.

2. The gate device according to claim 1, wherein
the at least one processor is configured to execute the instructions to:
acquire biological information about the approaching person, and determine whether the approaching person and the person to be authenticated are identical by one-to-one collation of the biological information about the approaching person and the biological information about the person to be authenticated.

3. The gate device according to claim 1, wherein
the at least one processor is configured to execute the instructions to:
acquire image data that includes the approaching person and determine—whether two or more face images are included in the acquired image data, and
control the gate in such a way that the person to be authenticated is permitted to pass in a case where two or more face images are not included in the image data.

4. The gate device according to claim 3, wherein
the at least one processor is further configured to execute the instructions to:
output a predetermined message in a case where two or more face images are included in the image data.

5. The gate device according to claim 4, wherein
the at least one processor is configured to execute the instructions to:
change the output predetermined message according to whether the image data includes a face image of the person to be authenticated.

6. The gate device according to claim 1, wherein
the at least one processor is configured to execute the instructions to:
acquire a face image of the person to be authenticated, and
transmit the authentication request including a feature amount generated from the face image of the person to be authenticated to the server device.

7. The gate device according to claim 1, wherein
the at least one processor is configured to execute the instructions to:
detect the approaching person based on a detection signal from a passage sensor using light.

8. The gate device according to claim 1, wherein
the at least one processor is further configured to execute the instructions to:
detect the person to be authenticated in the authentication area.

9. The gate device according to claim 8, wherein
the at least one processor is configured to execute the instructions to:
detect the person to be authenticated based on a detection signal from a motion sensor using infrared rays.

10. An authentication system comprising:
a server device that stores a plurality of pieces of biological information about a plurality of system users and performs an authentication process using the plurality of pieces of biological information; and
a gate device connected to the server device, wherein
the gate device includes:
at least one memory configured to store instructions; and
at least one processor configured to execute the instructions to:
acquire biological information about a person to be authenticated, wherein the person to be authenticated is present in an authentication area when the biological information is acquired;
transmit an authentication request including the acquired biological information to the server device;
detect an approaching person using a sensor that detects the approaching person within the gate device and determine whether the approaching person and the person to be authenticated are identical; and
control a gate in such a way that the person to be authenticated is permitted to pass when authentication by the server device in response to the authentication request is successful, the approaching person has been detected within the gate device within a predetermined time period after a process of detecting whether the approaching person is present within the gate device has been started, and the approaching person and the person to be authenticated are identical.

11. A gate control method comprising:

by a gate device, acquiring biological information about a person to be authenticated, wherein the person to be authenticated is present in an authentication area when the biological information is acquired;

transmitting an authentication request including the acquired biological information to a server device;

detecting an approaching person using a sensor that detects the approaching person within the gate device and determining whether the approaching person and the person to be authenticated are identical; and controlling a gate in such a way that the person to be authenticated is permitted to pass when authentication by the server device in response to the authentication request is successful, the approaching person has been detected within the gate device within a predetermined time period after a process of detecting whether the approaching person is present within the gate device has been started, and the approaching person and the person to be authenticated are identical.

* * * * *